United States Patent
Passini et al.

(10) Patent No.: US 9,494,614 B2
(45) Date of Patent: Nov. 15, 2016

(54) METHOD FOR ESTIMATING THE ROTATIONAL SPEED OF A TOOL MOUNTED ON A ROTATING SPINDLE OF A MACHINE TOOL AND SUCH A MACHINE TOOL

(71) Applicant: MARPOSS SOCIETA' PER AZIONI, Bentivoglio (BO) (IT)

(72) Inventors: Stefano Passini, Bologna (IT); Domenico Malpezzi, Brisighella (IT)

(73) Assignee: MARPOSS SOCIETA'PER AZIONI, Bentivoglio (BO) (IT)

( * ) Notice: Subject to any disclaimer, the term of this patent is extended or adjusted under 35 U.S.C. 154(b) by 253 days.

(21) Appl. No.: 14/398,612

(22) PCT Filed: May 16, 2013

(86) PCT No.: PCT/EP2013/060127
§ 371 (c)(1),
(2) Date: Nov. 3, 2014

(87) PCT Pub. No.: WO2013/174707
PCT Pub. Date: Nov. 28, 2013

(65) Prior Publication Data
US 2015/0092185 A1     Apr. 2, 2015

(30) Foreign Application Priority Data

May 25, 2012     (IT) .............................. BO2012A0289

(51) Int. Cl.
*G01P 3/36*     (2006.01)
*G01P 3/38*     (2006.01)
(Continued)

(52) U.S. Cl.
CPC .................. *G01P 3/38* (2013.01); *G01B 11/00* (2013.01); *G01D 5/342* (2013.01); *G01P 3/40* (2013.01); *G01P 21/02* (2013.01); *G05B 19/401* (2013.01)

(58) Field of Classification Search
CPC ............... G01P 3/38; G01P 3/40; G01P 21/02; G05B 19/401; G01B 11/00; G01D 5/342
(Continued)

(56) References Cited

U.S. PATENT DOCUMENTS

2002/0118372 A1   8/2002   Bucher et al.
2005/0270519 A1*  12/2005  Twerdochlib ......... F01D 21/003
                                                    356/24
2014/0300728 A1*  10/2014  Drescher .......... G01N 21/95692
                                                    348/92

FOREIGN PATENT DOCUMENTS

DE     10 2004 047 506 A1     3/2006
EP          2 159 779 A1      3/2010
WO         WO 92/21938 A1    12/1992

OTHER PUBLICATIONS

International Preliminary Report on Patentability and Written Opinion dated Nov. 25, 2014.

* cited by examiner

*Primary Examiner* — Mark Hellner
(74) *Attorney, Agent, or Firm* — Blank Rome LLP

(57) ABSTRACT

In a machine tool (1) comprising a rotating spindle (2) and a vision system (7) for acquiring images of a tool (3) mounted on the spindle, for each value (VC) of an interval (ICN) of preselected rotational speed values centered on a nominal rotational speed value (VN) of the spindle, an image acquisition period (TA) is determined, that is a multiple of the rotational period (TR) of the spindle calculated for that preselected speed value and compatible with the vision system, and, while the spindle is rotating at the (Continued)

nominal rotational speed, a representative couple of tool images that are temporally spaced apart from one another of the image acquisition period is obtained, in order to obtain an estimated speed value (VS), associated to the nominal speed value, by selecting that preselected speed value to which the representative couple of images that are the most similar to each other on the basis of a similarity rule corresponds.

13 Claims, 1 Drawing Sheet

(51) Int. Cl.
    *G01P 3/40*          (2006.01)
    *G01P 21/02*        (2006.01)
    *G01D 5/34*         (2006.01)
    *G01B 11/00*        (2006.01)
    *G05B 19/401*      (2006.01)

(58) Field of Classification Search
    USPC .......................................................... 356/28
    See application file for complete search history.

METHOD FOR ESTIMATING THE ROTATIONAL SPEED OF A TOOL MOUNTED ON A ROTATING SPINDLE OF A MACHINE TOOL AND SUCH A MACHINE TOOL

TECHNICAL FIELD

The present invention relates to a method for estimating the rotational speed of a tool mounted on a rotating spindle of a machine tool.

In particular, the present invention can advantageously, but not exclusively, be applied to the process of automatically measuring the tool executed by means of shadow casting, vision systems, to which reference will be explicitly made in the following specification without loss of generality.

BACKGROUND ART

As is common knowledge, a numerical control machine tool includes a mechanical structure with a spindle which carries a tool for machining objects and makes it rotate, and an electronic control unit to precisely control the spindle displacements along three or more axes of movement and the tool rotational speed.

The tool of a machine tool has to be measured, also when it is fast rotating about its axis, to determine its effective dimensions once it is mounted on the spindle or to determine its wear after some working hours. For this purpose, the machine tools are equipped with an automatic measuring system which enables to measure the geometrical features of the tool, including its dimensions, while it is rotating about its own axis.

An automatic measuring system is known, that includes a shadow casting vision system which comprises a source of unfocused light and a two-dimensional image sensor, for instance a CCD sensor, placed in front of, and at a certain distance from, the light source. When used, the tool to be measured must be placed, while it is rotating about its own axis, between the light source and the image sensor, within the visual field of the latter, in such a way that the image sensor can acquire images of the tool shadow. The geometrical features of the tool are measured on the basis of the images acquired by means of the vision system.

In order to carry out the wanted measurements, the vision system has to acquire images of the tool, that is rotating about the rotating axis, at different angular positions which are spaced apart from one another of a certain angular step. The rotating period of the tool to be measured is usually much shorter than the frame acquisition period of the image sensor. Therefore, in order to obtain images of the rotating tool with the wanted angular step, the vision system acquires images according to an acquisition period so that the tool performs, between two consecutive acquisitions, a certain integer number of complete revolutions plus a fraction of revolution equal to a wanted angular step.

In order to actually obtain images in the wanted angular positions, the rotational speed of the tool must be known with high precision. Indeed, it is possible to demonstrate that even differences of 1 part over 10000 between the nominal or known speed and the actual speed can lead to big acquisition errors, i.e. to obtaining images at angular positions that are far away from the wanted angular positions.

Thus far, two methods are essentially known to solve possible deviations of the actual speed value from the nominal one. A first known method consists in performing a number of acquisitions that is hugely redundant compared to a minimum number of acquisitions. This first method is often not feasible since too much execution time is required in comparison with the one allowed for carrying out the measuring cycle. The second known method consists in using a speed or position sensor arranged, for instance, on the spindle, in such a way that the speed real-time data, always updated and reliable, are available. This second method is in many cases not relished for it is considered too much invasive.

DISCLOSURE OF THE INVENTION

Object of the present invention is to provide a method for precisely determining the rotational speed of a tool mounted on a rotating spindle of a machine tool, such method being free from the previously described inconveniences and, concurrently, easily and cheaply implemented.

According to the present invention, a method for estimating the rotational speed of a tool mounted on a rotating spindle of a machine tool, a method for acquiring images of a tool mounted on a rotating spindle of a machine tool and a machine tool are provided, according to what is claimed in the attached claims.

BRIEF DESCRIPTION OF THE DRAWINGS

The present invention is now described with reference to the attached sheets of drawings, given by way of non-limiting examples, wherein.

BEST MODE FOR CARRYING OUT THE INVENTION

Figure 1:
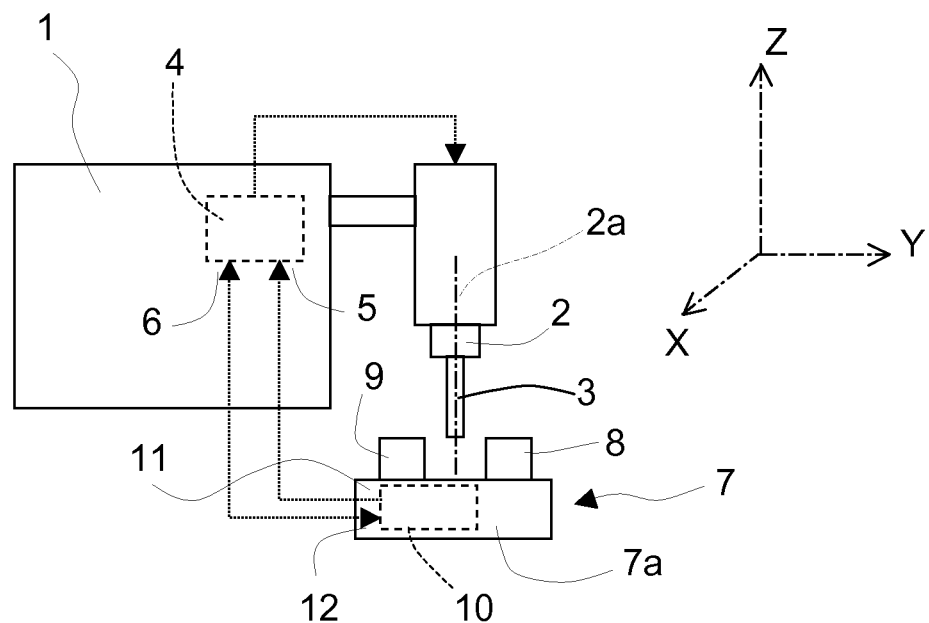
FIG. 1 shows a numerical control machine tool comprising a vision system that implements a method for estimating the rotational speed of a tool mounted on the spindle of the machine tool, which method is provided with the present invention.

A numerical control ("NC") machine tool is generically indicated, in FIG. 1, with reference 1, and comprises a spindle 2, on which a tool 3 is mounted, and a first electronic control unit 4, embodying the numerical control of the machine tool 1. The first electronic control unit 4 is able to control the rotational speed of the spindle 2 and to control movements of the spindle 2 along at least one displacement axis, typically along the three Cartesian axes X, Y and Z through dedicated actuators, known per se hence not illustrated.

The start and the stop of the movements of the spindle 2 along the displacement axes are usually controlled by the first control unit 4. However, the stop of the movements of the spindle 2 along the displacement axes can also be controlled, according to an alternative procedure, by an external unit through a specific input 5 of the first control unit 4, generally said "skip input". The first control unit 4 is also set up to record the position of the spindle 2 along the displacement axes, for instance as a function of the signal at the input 5. The first control unit 4 further includes a communication interface 6, for instance a port of an Ethernet network.

The machine tool 1 is provided with a visual system 7 adapted to measure geometrical features, e.g. the dimensions, of the tool 3 while the machine tool 1 keeps the spindle 2 rotating about its own rotation axis 2a. More specifically, the visual system 7 comprises a light source 8 and an image sensor 9, the latter being placed in front of, and at a certain distance from, the light source 8. The image sensor 9 is adapted to acquire images of the tool 3, more specifically images of the shadow of the tool 3 when the latter is placed between the light source 8 and the image sensor 9 by means of the movement of the spindle 2 along the displacement axes. The light source 8 and the image sensor 9 are mounted on a shared support frame 7a. The light source 8 generates an unfocused light beam and the image sensor 9 includes, for instance, a CCD digital sensor.

The visual field of the image sensor 9 defines a measuring area for the tool 3. Indeed, the tool 3 is measured by placing the rotating tool 3 in the visual field of the image sensor 9, acquiring images of the visual field and calculating, for instance, the dimensions of the tool 3 from the acquired images.

According to the present invention, the visual system 7 comprises a second electronic control unit 10 connected to the first control unit 4 to send controls to and exchange data with the first control unit 4. More specifically, the second control unit 10 comprises an output 11 connectable to the input 5 of the first control unit 4 and a communication port 12 connectable to the communication interface 6 of the first control unit 4. In FIG. 1, the second control unit 10 is shown as physically integrated into the support frame 7a, but, as an alternative, it can be physically distinct from the support frame 7a.

The first and second control units 4 and 10 are programmed in order to implement a method for estimating the rotational speed of a tool mounted on a rotating spindle, which method is provided with the present invention and is described hereafter.

An interval of preselected values VC of rotational speed, or preselected speed values VC, that is substantially centred on a nominal value VN of rotational speed of the spindle 2, or nominal speed value VN, is defined. A respective image acquisition period TA is determined for each of the preselected values VC such that it is equal to a multiple of one rotational period TR of the spindle 2 as calculated for that preselected value VC and it is compatible with the visual system 7, i.e. compatible with the maximum image rate (or "frame rate") of the image sensor 9. The nominal value VN is the speed selectable in the first control unit 4. For the sake of simplicity, the interval of preselected speed values VC centred on the nominal speed value VN is, sometimes, simply called first interval ICN of values hereafter. Supposing a 10000 rpm nominal value, the first interval ICN comprises, for instance, all the speed values between 9900 rpm and 10100 rpm with 1 rpm step.

On control of the first control unit 4, the spindle 2 is rotated at the nominal speed value VN and positioned in the visual field of the visual system 7. During such rotation, by means of the vision system 7, representative couples of images of the tool 3 are obtained, which images are, within each representative couple, temporally spaced apart from each other of the image acquisition period TA corresponding to one of the preselected speed values VC. An estimated speed value VS, to be associated with the nominal speed value VN, is defined as that preselected speed value, selected among all the preselected speed values VC, to which the representative couple of images that are the most similar to each other on the basis of a similarity rule corresponds. That is to say, for each representative couple of images, the respective value of a similarity index is calculated, that states the degree of similarity between the two images, and the estimated speed value VS is represented by that preselected speed value to which the representative couple of images that are the most similar to each other on the basis of a similarity rule corresponds.

The similarity rule comprises, for instance, the following processing. For each image of each representative couple of images, a respective matrix A, B of real numbers is defined, each of the real numbers being representative of the brightness of a respective pixel of the image. For each representative couple of images, a difference matrix C as difference, element by element, of the two matrices A and B relative to the two images of the representative couple of images is obtained, and the value of a norm N of the difference matrix C is calculated. The estimated speed value VS is represented by that preselected speed value, selected among all the preselected speed values VC, corresponding to the representative couple of images that gives the minimum value of the norm N. The similarity index is then represented by the norm N.

The computation of the image acquisition period TA, of the difference matrix C and of the norm N and the estimate of the estimated speed value VS are, for instance, executed by the second control unit 10.

According to a further feature of the invention, the first and second control units 4 and 10 are set up to implement a method for acquiring images of a tool mounted on a rotating spindle, that is based on said method for estimating the rotational speed of the tool, in the way described here below.

The spindle 2 is rotated at the nominal speed value VN and an actual rotational speed value VE of the spindle 2 is determined. Images of the tool 3 are acquired through the vision system 7 at a temporal cadence TM that is calculated as a function of the actual speed value VE and such that the tool 3 performs, between two consecutive acquisitions, an integer number of complete revolutions plus a fraction of revolution equal to a wanted angular step β. So, the acquired images show the tool 3, while it is rotating about the axis 2a, in different angular positions which are spaced apart from one another of the angular step β. The images acquired in such a way can be then used, for instance, to measure the geometrical features of the tool 3.

Figure 2:
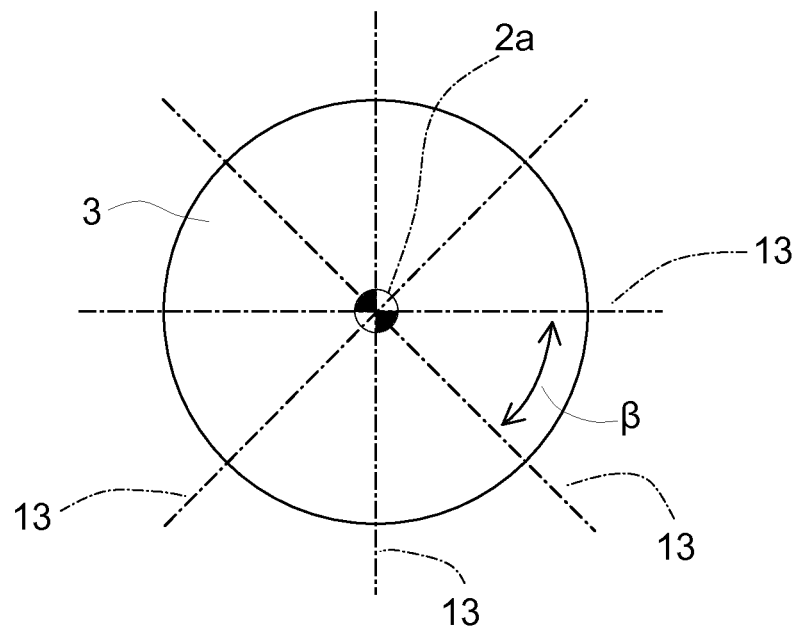
FIG. 2 is a very schematic and enlarged cross-sectional view of the tool of FIG. 1, showing an example of angular positions at which it is wanted to acquire images of the tool according to a temporal cadence that is calculated as a function of the rotational speed estimated by means of the method of the invention.

By way of example, in FIG. 2, that is an extremely schematic cross-sectional view perpendicular to the axis 2a of the tool 3, references 13 indicate some planes, belonging of a sheaf of planes defined by axis 2a, that are angularly spaced from one another of the angular step β (45° according to FIG. 2, to be considered as a non limiting example). Hence, the acquired images must show the tool 3 in the angular positions defined by the longitudinal planes 13. That is to say, the longitudinal planes 13 define the frame planes for acquiring the images of the tool 3.

According to the invention, the method for acquiring images of the tool 3 includes a calibration phase, i.e. a preliminary phase of calibrating the rotational speed value in order to provide, by means of the method for estimating the rotational speed previously described, a first estimated speed value VS1 that is associated with the nominal speed value VN. The actual speed value VE is determined as a function of the first estimated speed value VS1.

For instance, the actual speed value VE coincides with the first estimated speed value VS1 or, according to a preferred embodiment of the invention, with a second estimated speed value VS2 that is obtained by applying the method for estimating the rotational speed to a second interval of preselected speed values VC that is substantially centred on the first estimated speed value VS1, hereinafter called second interval ICS of values, instead of the first interval ICN of values. In other words, the previously described estimating method is applied, that is modified in such a way that the nominal speed value VN is substituted with the first estimated speed value VS1 and the first interval ICN of values is substituted with the second interval ICS of values.

Typically, the second interval ICS of values is narrower than the first interval ICN of values and, advantageously, the preselected speed values VC of the first interval ICS can be spaced apart from one another of an amount lesser than that of the second interval ICN. According to an example of embodiment, while the previously mentioned first interval ICN includes about 200 preselected speed values VC spaced apart of 1 rpm from one another, the second interval ICS has about 40 preselected speed values spaced apart of 0.5 rpm from one another.

The phase of calibrating the rotating speed value enables to mostly correct the error between the nominal speed value VN assigned to the spindle 2 by the first control unit 4 and the speed at which the tool 3 actually rotates. The phase of determining the actual speed value VE, that in the preferred embodiment of the invention is performed, at the start of the phase of acquiring the tool images in the different angular positions, by applying the method for estimating the rotational speed to the second interval ICS of values, enables to correct possible speed variations over the short term.

Advantageously, according to one of the possible options of the present invention, the second estimated speed value VS2 can be obtained without analysing all the preselected speed values VC of the second interval ICS, in order to reduce the computation time. More specifically, the procedure including the determination of the images acquisition period TA, the obtainment of the respective representative couple of images and the processing of the similarity rule is carried out on groups of at least three preselected speed values VC adjacent to one another and including two end values. The procedure is stopped when a certain group is found that includes a certain preselected speed values VCc, i.e. a preselected speed value VC, different from the two end values of the group, to which the representative couple of images that are the most similar to each other within the group corresponds. The certain preselected speed value VCc, that may be the central value of the group, and in any case is not any of the lowest and the highest preselected speed values VC of the group, defines the desired second estimated speed value VS2. More specifically, the analysis of the second interval ICS, performed on groups of three values VC per time, is stopped when a group of three values VC is found, such that the central of such three values features a minimum value of the norm N.

For instance, supposing that the second interval ICS comprises 2n+1 speed values, that the speed values of the second interval ICS are provided with an index that assumes all the values of the natural numbers array

[−n, . . . , −2, −1, 0, 1, 2, . . . , n]

where index i=0 identifies the central speed value that is equal to the first estimated speed value VS1, and that the analysis starts from the central value (i=0), then the first group of preselected speed values is identified by the indexes [−1, 0, 1]. The norm N is calculated for the three representative couples of images identified by the indexes i=[−1, 0, 1]: if the value of the norm N related to the index i=0 is lower then the values of the norm N for the other two indexes (corresponding to the end values of the group), then the value of the norm N for the index i=0 is a minimum and the central speed value is the second estimated speed value VS2 that is wanted. Otherwise the analysis goes on with the second group of preselected speed values identified by the indexes i=[−2, −1, 0]. If, even for the second group of preselected speed values, the minimum value of the norm N does not correspond to the central value (index i=−1), the analysis goes on with a third group of preselected speed values identified by the indexes i=[0, 1, 2], and so on, to the extent of analysing, in the worst case, all the values of the second interval ICS.

Advantageously, the phase of calibrating the rotational speed value is performed for a plurality of nominal speed values VNj in order to obtain a corresponding plurality of estimated speed values VSj. By associating to each nominal speed value VNj the corresponding estimated speed value VSj obtained by means of the estimating method described above, a table of couples of nominal and estimated speed values VNj, VSj is filled in, and can be recorded in an internal data storage of the second control unit 10. Such table is used for obtaining the first estimated speed value VS1—during the phase of determining the actual speed value VE—by using the nominal speed value VN as input.

Variations to what has been described and illustrated until now by way of simple non limiting examples are possible, for instance as regards the operation of obtaining the representative couples of images of the tool 3. In order to counteract possible problems due to images that could show a null or very small percentage of the tool 3, during the rotation of the spindle 2, sets of trial couples of images of the tool 3 are acquired by means of the vision system 7, more specifically a set of trial couples per each image acquisition period TA corresponding to one of the preselected speed values VC. Within each set, different trial couples are temporally spaced apart from one another of a fraction of the relative image acquisition period TA, and the images of each trial couple are temporally spaced apart from each other of said image acquisition period TA. Then a reliability index may be assigned to each trial couple, that is an index depending, for instance, on the percentage of the tool 3 that is actually visible in the relative trial couple of images. According to this different embodiment of the invention, each of the representative couples of images of the tool 3 is obtained from one out of the trial couples of a set, for instance by choosing one of the trial couples on the basis of said reliability indexes, or by defining a representative couple of so-called cumulative images, where each cumulative image may be calculated as a function, for instance as a weighted average, of the images of the trial couples of one set—one image out of each trial couple —, preferably taking into account the relative reliability indexes.

The main advantage of the method for estimating the rotational speed of a tool mounted on a rotating spindle according to the present invention is to obtain speed values with a very low error rate through a quite rapid process and without the need of modifying the machine tool or adding supplemental devices. Such advantage is especially useful in a method for acquiring images of a tool mounted on a rotating spindle, during which the tool images in different angular positions, spaced apart from one another of a certain angular step, are acquired in order to measure the geometrical features of the tool.

The invention claimed is:

1. A method for estimating the rotational speed of a tool mounted on a rotating spindle of a machine tool by using a visual system which acquires images of the tool while it is rotating; the method comprising the following steps:

rotating the spindle at a nominal speed value;

positioning the tool in the visual field of the visual system;

obtaining, by said visual system, representative couples of images of the tool;

defining a first interval of preselected speed values of rotational speed that is substantially centred on the nominal speed value of rotational speed of the spindle;

for each of said preselected speed values, determining a respective image acquisition period such that it is equal to a multiple of one rotational period of the spindle as calculated for that preselected speed value and compatible with said visual system;

said images of the tool obtained by said visual system being, within each representative couple, temporally spaced apart from each other of the image acquisition period corresponding to one of said preselected speed values; and determining an estimated speed value to be associated with said nominal speed value as that preselected speed value, selected among all the preselected speed values, to which the representative couple of images that are the most similar to each other on the basis of a similarity rule corresponds.

2. The method according to claim 1, wherein said similarity rule includes the following processing steps:

for each image of each representative couple of images, defining a respective matrix of real numbers, each of the real numbers being representative of the brightness of a respective pixel of the image;

for each representative couple of images, obtaining a difference matrix as difference of the two matrices relative to the two images of the representative couple of images;

calculating a respective value of a norm of the difference matrix; and selecting, as estimated speed value, that preselected speed value to which the minimum value of said norm corresponds.

3. The method according to claim 1, wherein the step of obtaining, by means of said visual system, representative couples of images of the tool includes acquiring sets of trial couples of images of the tool by means of the vision system, in each one of said sets the images of each of said trial couples being temporally spaced apart from each other of the image acquisition period corresponding to one of the relative preselected speed value, and the trial couples being temporally spaced apart from one another of a fraction of the same image acquisition period, and obtaining each one of said representative couples of images of the tool from one of said sets of trial couples.

4. The method according to claim 3, wherein a reliability index is assigned to each trial couple, the reliability index depending on the percentage of the tool that is actually visible in each image of the trial couple.

5. The method according to claim 4, wherein each of said representative couples of images of the tool is obtained by choosing one out of the trial couples of one set on the basis of the reliability indexes.

6. The method according to claim 3, wherein each of said representative couples of images of the tool is obtained by defining a representative couple of cumulative images, the cumulative images being calculated as function of the images of the trial couples of one set, one image out of each trial couple for each of the cumulative images.

7. A method for acquiring images of a tool mounted on a rotating spindle of a machine tool; the method including the following steps:

rotating the spindle at a nominal speed value;

determining an actual speed value of rotational speed of the spindle; and acquiring, by means of a visual system, images of the tool at a temporal cadence that is calculated as a function of the actual speed value and is such that the tool performs, between two consecutive acquisitions, one or more complete revolutions plus a fraction of revolution equal to a wanted angular step in such a way that the acquired images show the tool in different angular positions which are spaced apart from one another of said angular step;

the method including a calibration phase, in which a first estimated speed value, to be associated with said nominal speed value, is obtained with the method for estimating the rotational speed of a tool mounted on a rotating spindle of a machine tool according to claim 1, and the actual speed value is determined as a function of said first estimated speed value.

8. The method according to claim 7, wherein said actual speed value coincides with the first estimated speed value.

9. The method according to claim 7, wherein said actual speed value coincides with a second estimated speed value obtained with said method for estimating the rotational speed of a tool mounted on a rotating spindle of a machine tool that is modified in such a way that said nominal speed value is substituted with said first estimated speed value and said first interval of preselected speed values is substituted with a second interval of preselected speed values that is substantially centred on the first estimated speed value.

10. The method according to claim 9, wherein said second interval of preselected speed values is narrower than said first interval of preselected speed values.

11. The method according to claim 9, wherein said second estimated speed value is obtained with said method for estimating the rotational speed of a tool mounted on a rotating spindle of a machine tool modified in such a way that the procedure including the determination of the image acquisition period, the acquisition of the representative couple of images and the processing of the similarity rule is carried out on groups of at least three preselected speed values adjacent to one another and including two end values, and is stopped when a certain group out of said groups is found including a certain preselected speed value, differing from said two end values of said certain group, to which a representative couple of images that are the most similar to each other within said certain group corresponds, said certain preselected speed value defining said second estimated speed value.

12. A machine tool comprising a spindle on which a tool is mounted, a first electronic control unit which is adapted to control the rotational speed of the spindle, and a visual system for acquiring images of the tool while it is rotating; wherein the visual system comprises a second electronic control unit connected to communicate with the first control unit, and in that the first and second control units are configured to implement the method for estimating the rotational speed of a tool mounted on a rotating spindle of a machine tool according to claim 1.

13. The machine tool according to claim 12, wherein said first and second control units are configured to implement a method for acquiring images of a tool comprising the following steps:
- rotating the spindle at a nominal speed value;
- determining an actual speed value of rotational speed of the spindle; and
- acquiring, by means of a visual system, images of the tool at a temporal cadence that is calculated as a function of the actual speed value and is such that the tool performs, between two consecutive acquisitions, one or more complete revolutions plus a fraction of revolution equal to a wanted angular step in such a way that the acquired images show the tool in different angular positions which are spaced apart from one another of said angular step;
- the method for acquiring images further including a calibration phase, in which a first estimated speed value, to be associated with said nominal speed value, is obtained with said method for estimating the rotational speed of a tool mounted on a rotating spindle of a machine tool, and the actual speed value is determined as a function of said first estimated speed value.

* * * * *